(12) United States Patent
Cole et al.

(10) Patent No.: US 12,007,491 B2
(45) Date of Patent: Jun. 11, 2024

(54) GPS ASSISTED WALKOVER LOCATING SYSTEM AND METHOD

(71) Applicant: The Charles Machine Works, Inc., Perry, OK (US)

(72) Inventors: Scott B. Cole, Edmond, OK (US); Brian J. Schrock, Fulshear, TX (US); Klayton Day Jones, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 17/857,623

(22) Filed: Jul. 5, 2022

(65) Prior Publication Data

US 2022/0334266 A1 Oct. 20, 2022

Related U.S. Application Data

(63) Continuation of application No. 16/549,740, filed on Aug. 23, 2019, now Pat. No. 11,397,266.

(60) Provisional application No. 62/724,161, filed on Aug. 29, 2018.

(51) Int. Cl.
*G01S 19/45* (2010.01)
*G01S 19/48* (2010.01)
*G01V 3/08* (2006.01)
*G01S 5/00* (2006.01)
*G01S 19/38* (2010.01)
*G01S 19/42* (2010.01)

(52) U.S. Cl.
CPC .............. *G01S 19/45* (2013.01); *G01S 19/48* (2013.01); *G01V 3/081* (2013.01); *G01S 5/018* (2020.05); *G01S 19/38* (2013.01); *G01S 19/42* (2013.01)

(58) Field of Classification Search
CPC .......... G01S 19/45; G01S 19/38; G01S 19/42; G01S 19/48; G05S 5/018; G01V 3/081
USPC ............. 342/357.28, 357.31, 357.25, 357.21
See application file for complete search history.

(56) References Cited

U.S. PATENT DOCUMENTS

| | | |
|---|---|---|
| 4,390,836 A | 6/1983 | Bruce et al. |
| 4,542,344 A | 9/1985 | Darilek et al. |
| 4,742,356 A | 5/1988 | Kuipers |
| 4,812,812 A | 3/1989 | Flowerdew et al. |

(Continued)

FOREIGN PATENT DOCUMENTS

| | | | | |
|---|---|---|---|---|
| CN | 111173451 A | * | 5/2020 | ........... E21B 47/024 |
| DE | 19533105 A1 | | 10/1996 | |

(Continued)

OTHER PUBLICATIONS

Subsite Electronics, "TK Recon Series Guidance System", Operator's Manual, Jun. 2016, 63 pages, Perry, Oklahoma.

*Primary Examiner* — Chuong P Nguyen
(74) *Attorney, Agent, or Firm* — Tomlinson McKinstry, P.C.

(57) ABSTRACT

A method and system for using GPS signals and a magnetic field to track an underground magnetic field source. A tracker having an antenna for detecting the magnetic field and a GPS receiver is coupled to a processor. The magnetic field is used by the antenna to direct the tracker to a field null point. Once multiple measurements of the field are taken, the changes in signal strength as the absolute position of the tracker is changed, are used to determine whether the closest field null point is in front of or behind the underground beacon. The position and depth of the beacon can then be estimated.

14 Claims, 12 Drawing Sheets

(56) References Cited

U.S. PATENT DOCUMENTS

| | | | |
|---|---|---|---|
| 5,264,795 A | 11/1993 | Rider | |
| 5,397,986 A | 3/1995 | Conway et al. | |
| 5,529,437 A | 6/1996 | Filipowski et al. | |
| 5,576,973 A | 11/1996 | Haddy | |
| 5,640,092 A | 6/1997 | Motazed et al. | |
| 5,699,048 A | 12/1997 | Galloway | |
| 6,005,532 A | 12/1999 | Ng | |
| 6,035,951 A | 3/2000 | Mercer et al. | |
| 6,250,402 B1 | 6/2001 | Brune et al. | |
| 6,268,731 B1 | 7/2001 | Hopwood et al. | |
| 6,315,062 B1 * | 11/2001 | Alft | E21B 17/028 175/45 |
| 6,364,035 B2 | 4/2002 | Brune et al. | |
| 6,536,538 B2 | 3/2003 | Brune et al. | |
| 6,563,474 B2 | 5/2003 | Nantz et al. | |
| 6,668,944 B2 | 12/2003 | Brune et al. | |
| 6,737,867 B2 | 5/2004 | Brune et al. | |
| 6,749,029 B2 | 6/2004 | Alft et al. | |
| 6,865,455 B1 | 3/2005 | Wiegert | |
| 6,868,314 B1 | 3/2005 | Frink | |
| 6,882,154 B2 | 4/2005 | Mercer et al. | |
| 6,924,767 B2 | 8/2005 | Kitahara et al. | |
| 7,000,710 B1 | 2/2006 | Umbach | |
| 7,009,399 B2 | 3/2006 | Olsson et al. | |
| 7,013,990 B1 | 3/2006 | Nickel et al. | |
| 7,021,403 B2 | 4/2006 | Brune et al. | |
| 7,042,411 B2 | 5/2006 | Yagi et al. | |
| 7,111,693 B1 * | 9/2006 | Self | E21B 47/0232 175/45 |
| 7,231,320 B2 | 6/2007 | Papadimitriou et al. | |
| 7,347,280 B2 | 3/2008 | Brune et al. | |
| 7,350,594 B2 | 4/2008 | Cole et al. | |
| 7,356,421 B2 | 4/2008 | Gudmundsson et al. | |
| 7,510,029 B2 * | 3/2009 | Gunsaulis | E21B 7/10 175/45 |
| 7,562,722 B2 | 7/2009 | Brune et al. | |
| 7,647,987 B2 | 1/2010 | Cole | |
| 7,656,159 B2 | 2/2010 | Edelstein | |
| 7,786,731 B2 | 8/2010 | Cole et al. | |
| 7,952,357 B2 | 5/2011 | Cole | |
| 8,018,382 B2 | 9/2011 | Shore et al. | |
| 8,025,109 B2 | 9/2011 | Brune et al. | |
| 8,072,220 B2 | 12/2011 | Dolgin et al. | |
| 8,188,745 B2 | 5/2012 | Overby et al. | |
| 8,393,414 B2 | 3/2013 | Brune et al. | |
| 8,482,286 B2 | 7/2013 | Cole | |
| 8,497,684 B2 | 7/2013 | Cole et al. | |
| 8,928,323 B2 | 1/2015 | Cole et al. | |
| 9,081,109 B1 * | 7/2015 | Olsson | G01V 3/15 |
| 9,329,297 B2 | 5/2016 | Cole et al. | |
| 9,547,101 B2 * | 1/2017 | Cole | G01V 3/30 |
| 10,162,074 B2 * | 12/2018 | Olsson | H01Q 1/1235 |
| 10,459,105 B2 | 10/2019 | Cole et al. | |
| 10,822,941 B2 * | 11/2020 | Perteet | E21B 47/024 |
| 10,877,176 B2 * | 12/2020 | Cole | E21B 47/092 |
| 11,149,539 B2 | 10/2021 | Zeller et al. | |
| 11,639,661 B2 * | 5/2023 | Marshall | E21B 47/092 175/45 |
| 2002/0020559 A1 | 2/2002 | Barbera et al. | |
| 2002/0116129 A1 | 8/2002 | Alft et al. | |
| 2004/0070399 A1 | 4/2004 | Olsson et al. | |
| 2004/0190374 A1 | 9/2004 | Alft et al. | |
| 2006/0036376 A1 | 2/2006 | Gudmundsson et al. | |
| 2006/0055584 A1 | 3/2006 | Waite et al. | |
| 2007/0044536 A1 | 3/2007 | Gunsaulis et al. | |
| 2009/0153141 A1 | 6/2009 | Mercer | |
| 2010/0001731 A1 | 1/2010 | Royle et al. | |
| 2010/0002938 A1 | 1/2010 | Mulcahey | |
| 2011/0227575 A1 | 9/2011 | Cole | |
| 2012/0146648 A1 | 6/2012 | Eick et al. | |
| 2013/0153299 A1 | 6/2013 | Brune et al. | |
| 2013/0175092 A1 | 7/2013 | Kolpak et al. | |
| 2014/0111211 A1 | 4/2014 | Cole et al. | |
| 2014/0163775 A1 | 6/2014 | Metzler | |
| 2014/0222248 A1 | 8/2014 | Levien et al. | |
| 2014/0303814 A1 | 10/2014 | Burema et al. | |
| 2015/0090496 A1 | 4/2015 | Rempe et al. | |
| 2015/0149000 A1 | 5/2015 | Rischmuller et al. | |
| 2016/0018551 A1 | 1/2016 | Cole et al. | |
| 2016/0356146 A1 | 12/2016 | Gard et al. | |
| 2017/0022800 A1 * | 1/2017 | Perteet | G01V 3/15 |
| 2017/0226805 A1 * | 8/2017 | Cole | E21B 7/046 |
| 2017/0299755 A1 | 10/2017 | Cole et al. | |
| 2018/0299575 A1 * | 10/2018 | Cole | G01V 3/26 |
| 2019/0004203 A1 | 1/2019 | Olsson et al. | |
| 2021/0131615 A1 | 5/2021 | Bailey et al. | |
| 2023/0056853 A1 * | 2/2023 | Cole | G01V 3/08 |
| 2023/0314593 A1 * | 10/2023 | Cole | G01S 13/86 342/61 |

FOREIGN PATENT DOCUMENTS

| | | |
|---|---|---|
| EP | 0045486 A3 | 10/1982 |
| EP | 1526606 A1 | 4/2005 |
| GB | 2006438 A | 5/1979 |
| JP | 2021288 A | 7/1988 |
| JP | 2003249816 A1 | 9/2003 |
| WO | 9530913 A1 | 11/1995 |
| WO | 0010456 A1 | 3/2000 |
| WO | 2006124520 A3 | 11/2006 |

\* cited by examiner

GPS ASSISTED WALKOVER LOCATING SYSTEM AND METHOD

SUMMARY

The invention is directed to an above-ground tracking system. The system comprises a portable frame, a triaxial antenna, a global positioning system receiver, a processor, and a memory. The triaxial antenna is by the frame and responsive to a magnetic dipole field. The GPS receiver is supported by the frame. The processor is coupled to the antenna and receiver. The memory is coupled to the processor and has program instructions stored therein. The instructions, when executed by the processor, perform steps. In response to a first and single user request, a first set of measurements are obtained.

The measurements comprise a location measurement from the global positioning receiver and a magnetic field measurement from the receiving antenna. In response to a second, subsequent and single user request, a second set of measurements is obtained. The second set of measurements comprise a location measurement from the global positioning receiver and a magnetic field measurement from the receiving antenna. Thereafter, an estimated position of the source of the dipole field is determined using the first and second sets of measurements.

In another aspect, the invention is directed to a method of observing an underground dipole field source at a first underground location. The dipole field source has a magnetic field arranged in a radiation pattern.

At an above ground location, the magnetic field is measured with a receiving antenna. A set of geographical coordinates are obtained for the first above-ground location using a GPS receiver. Thereafter, the receiving antenna and GPS receiver are moved to a second above-ground location. Thereafter, the magnetic field is measured at the second above-ground location using the receiving antenna. A set of geographical coordinates are obtained for the second above-ground location using the GPS receiver. Thereafter, the underground source of the magnetic field is estimated using the two magnetic field measurements and the two sets of graphical coordinates.

DETAILED DESCRIPTION

Figure 1:
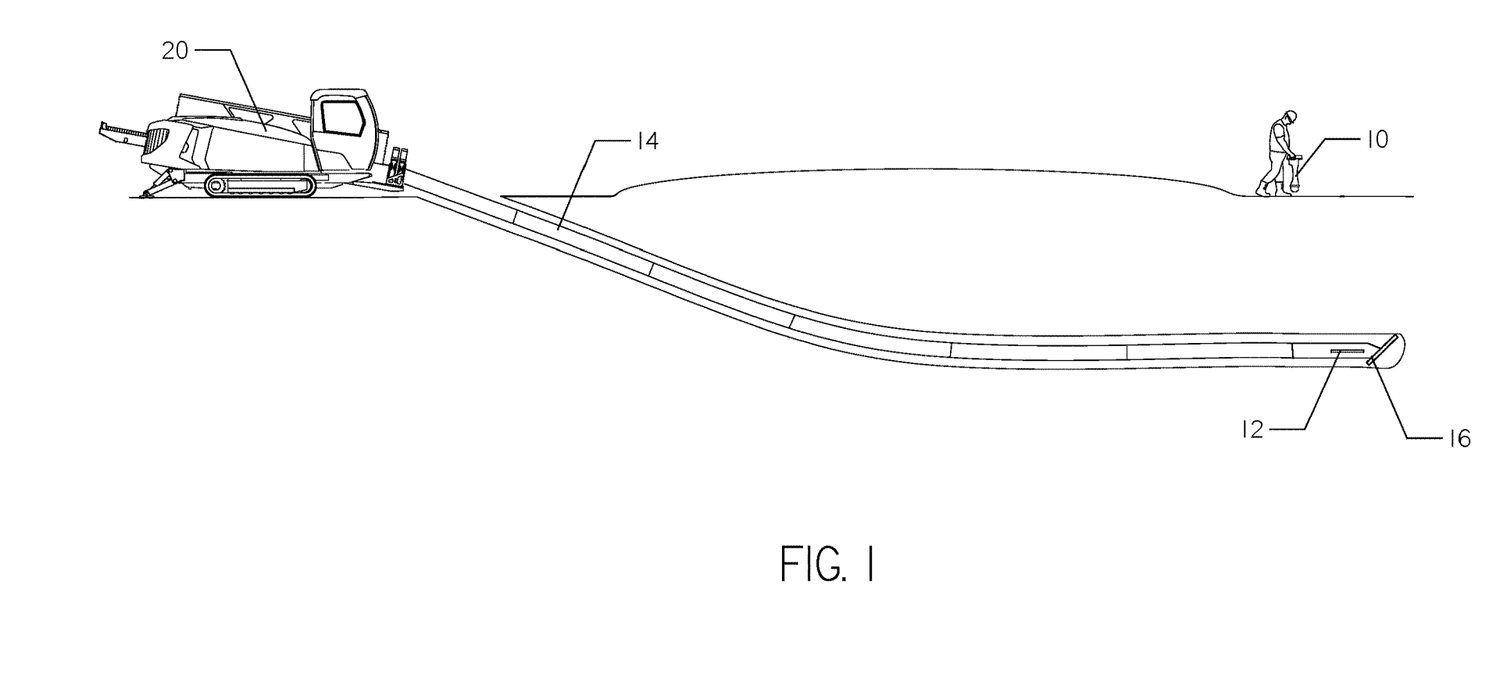
FIG. 1 is a diagrammatic representation of a horizontal drilling operation using an underground beacon and an above ground tracker.

Turning now to the figures, FIG. 1 shows a horizontal directional drilling machine 20 which is driving a drill string 14 in an underground environment. The drill string 14 supports a bit 16 at its distal end. The bit 16 is disposed just in front of a beacon 12. The beacon 12 emits a dipole magnetic field 21 into the underground environment which is detectable at an above ground location. A tracker 10 is used to determine the location of the beacon 12. An exemplar tracker 10 is disclosed and discussed in U.S. Pat. No. 7,647,987, issued to Cole, the contents of which are incorporated herein by reference.

Conventional trackers may utilize global positioning system (GPS) technology to aid in mapping an underground path of the beacon 12. This map usually corresponds to a bore path and an underground utility to be installed along the bore path. A system for incorporating GPS data into bore path mapping and planning is shown in U.S. Patent Pub. No. 2017/0226805, Cole, the contents of which are incorporated herein by reference.

Figure 2A:
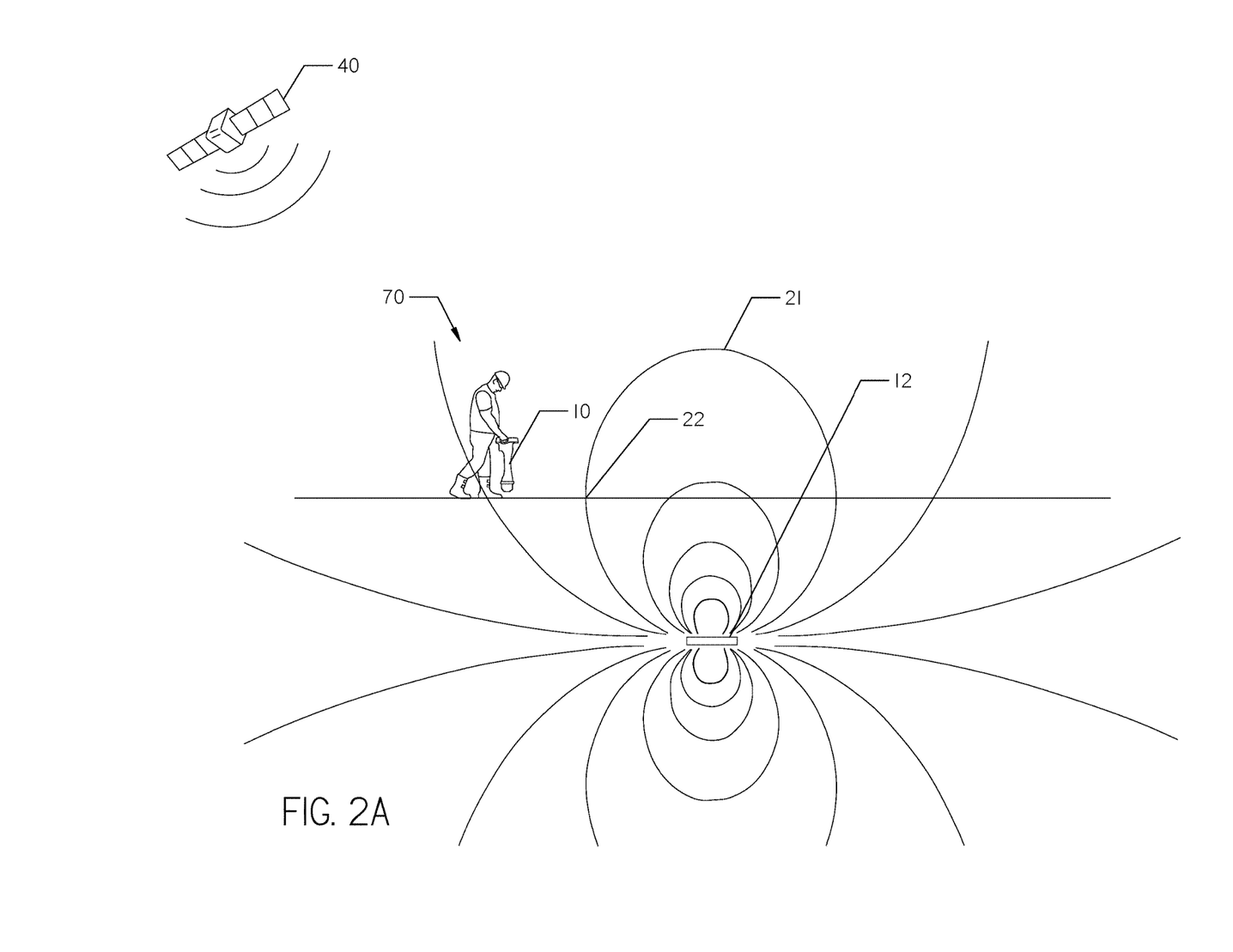
FIG. 2A is a side view of a tracker being used in conjunction with a below ground magnetic field source and a GPS signal at a first location.
Figure 2B:
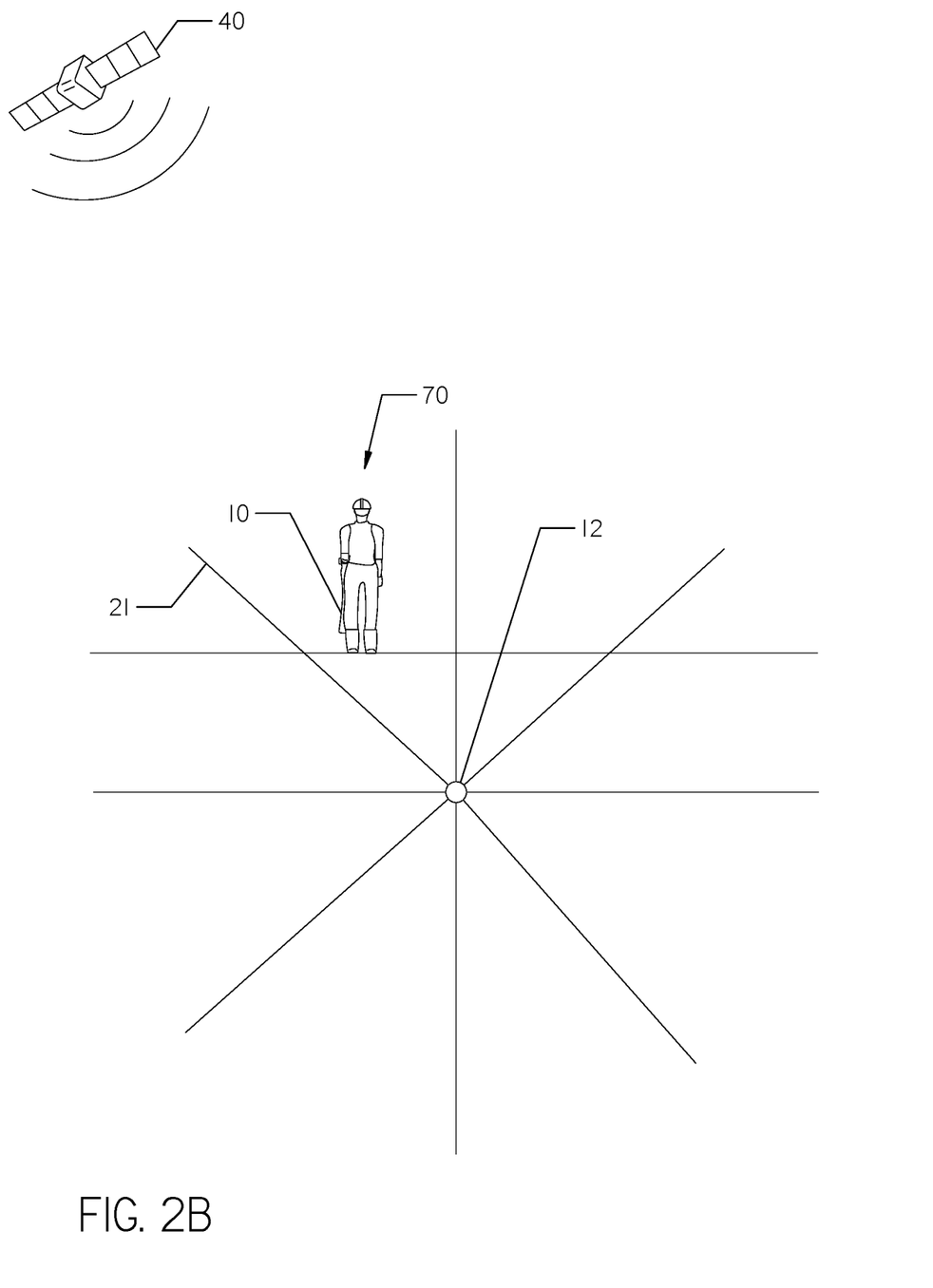
FIG. 2B is a back view of a tracker used in conjunction with a below ground magnetic field source and a GPS signal at the first location.
Figure 2C:
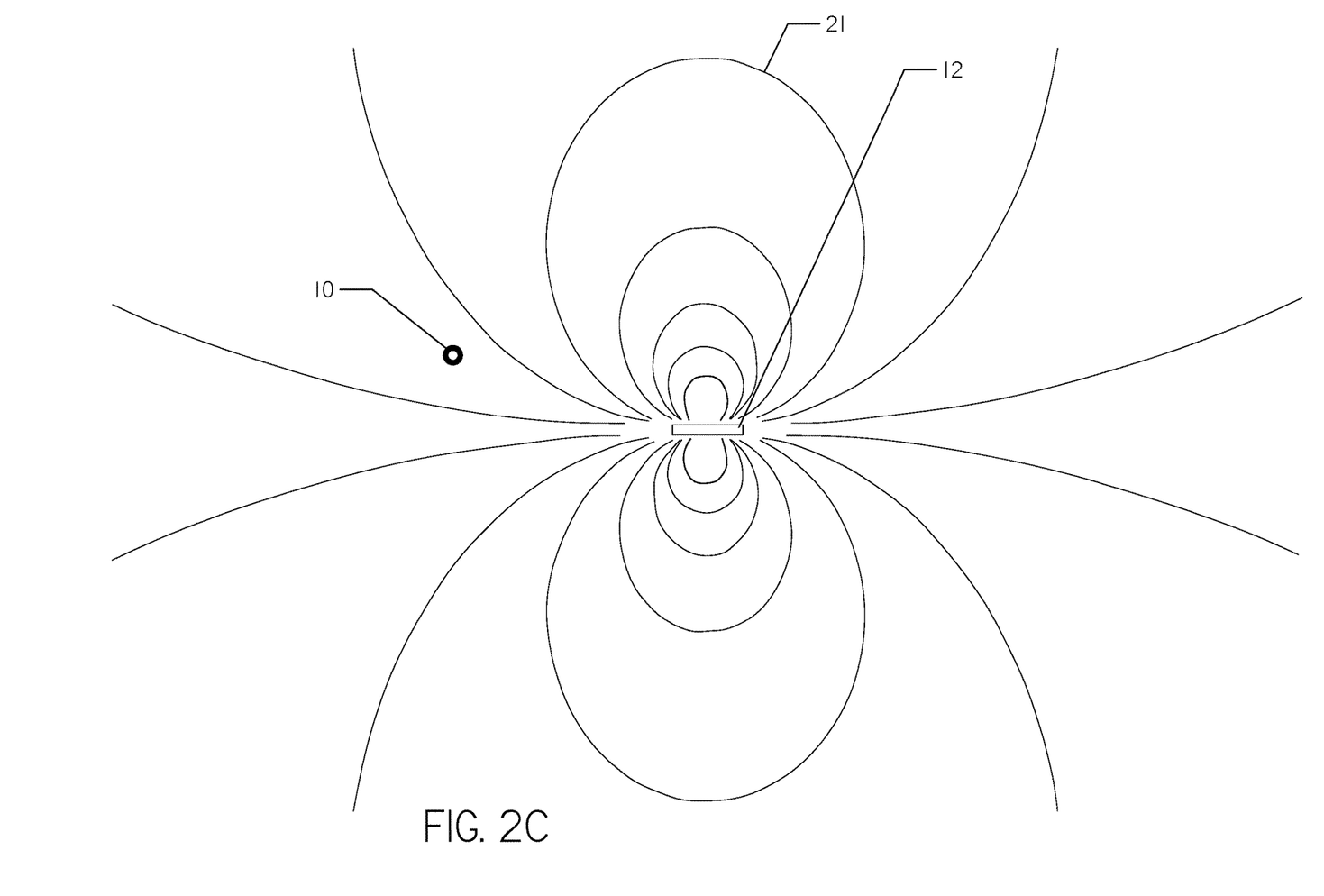
FIG. 2C is a top view of a tracker being used in conjunction with a below ground magnetic field source and a GPS signal at the first location. The ground surface is transparent so that the tracker location and beacon location can be displayed.
Figure 3A:
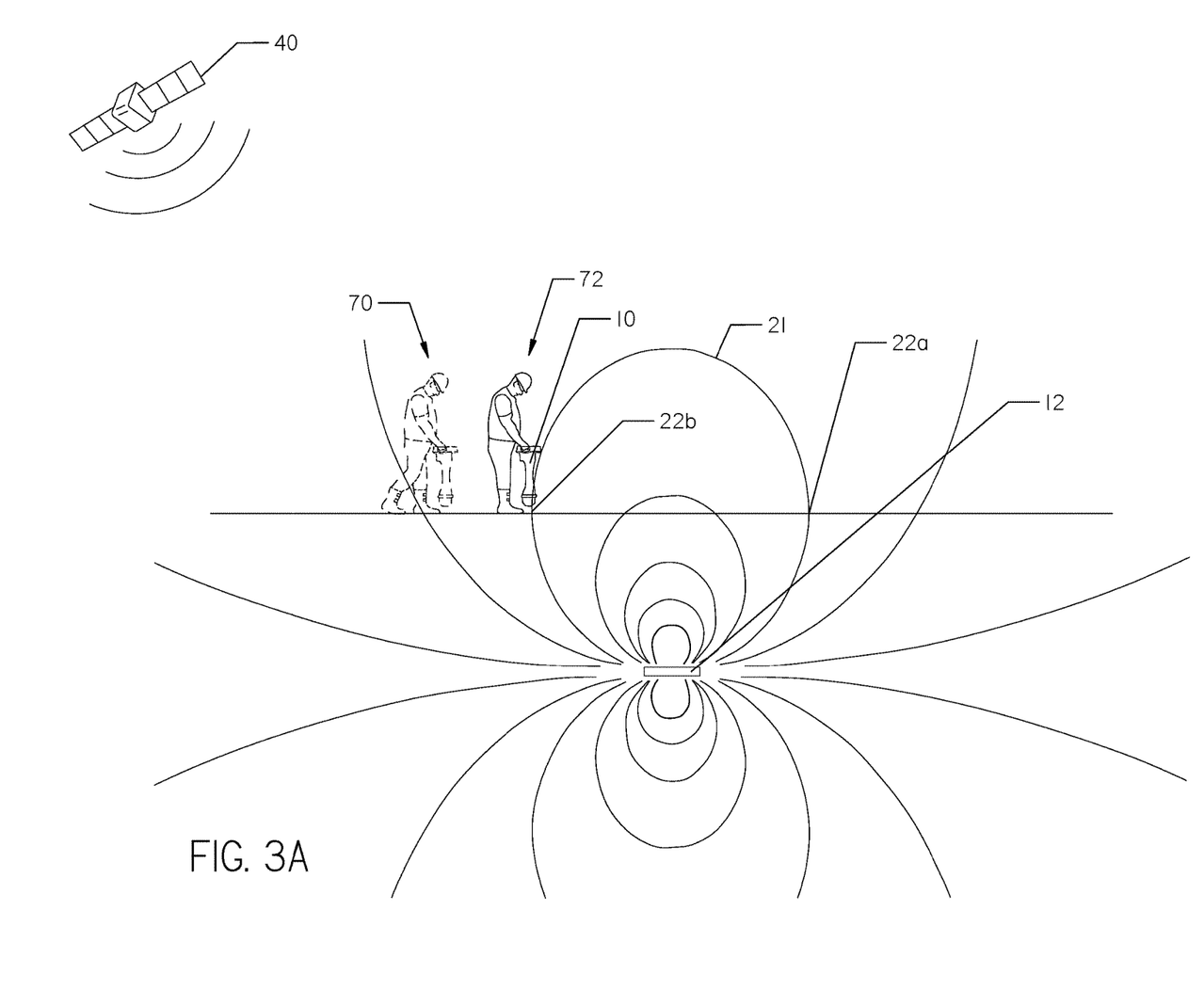
FIG. 3A is a side view of a tracker being used in conjunction with a below ground magnetic field source and a GPS signal at a second location. The first location as represented in FIG. 2A is shown in dashed line.
Figure 3B:
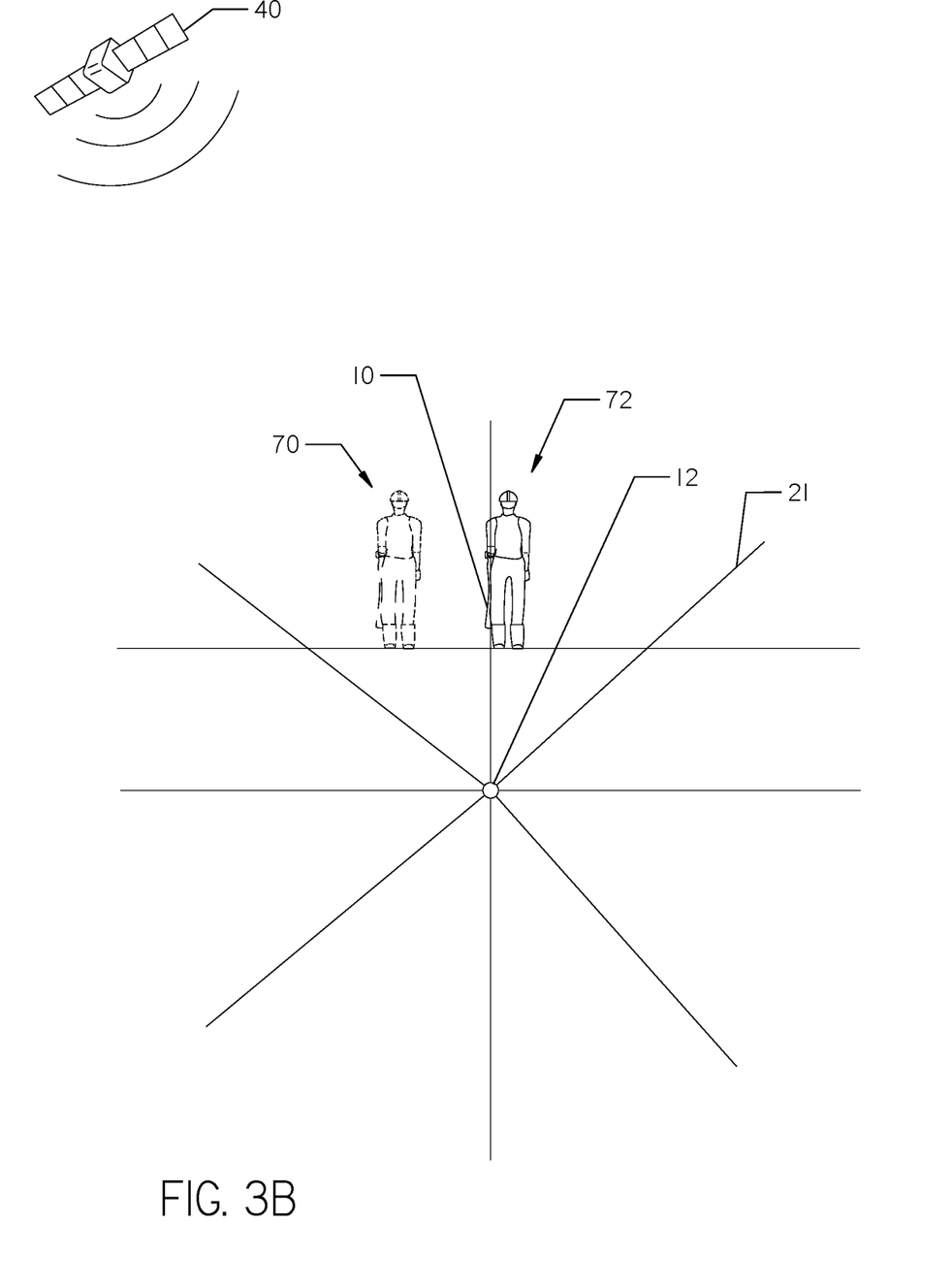
FIG. 3B is a back view of a tracker used in conjunction with a below ground magnetic field source and a GPS signal at the second location. The first location as represented in FIG. 2B is shown in dashed line.
Figure 3C:
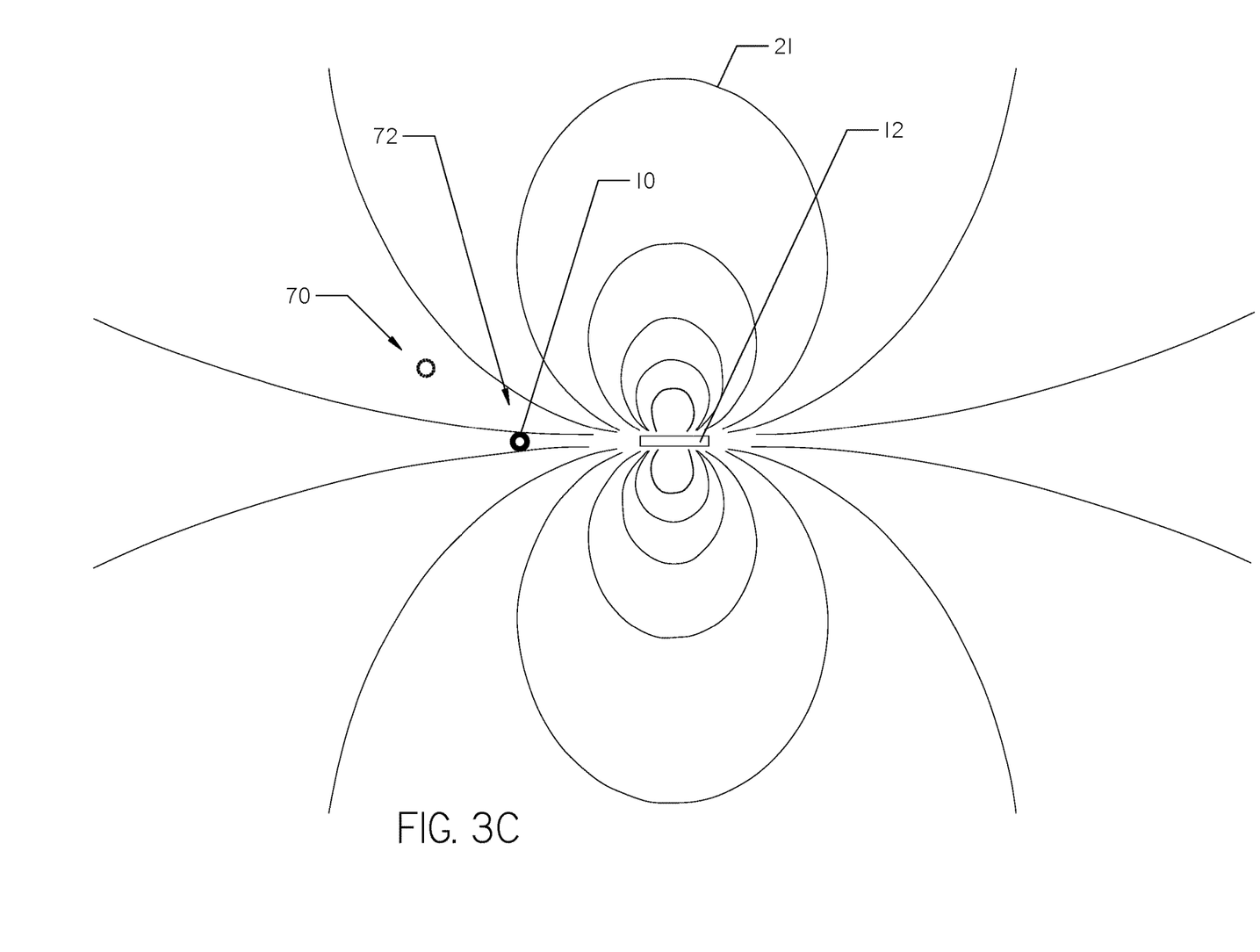
FIG. 3C is a top view of a tracker being used in conjunction with a below ground magnetic field source and a GPS signal at the second location. The ground surface is transparent so that the tracker location and beacon location can be displayed. The first location as represented in FIG. 2C is shown in dashed line.

While GPS receivers have been used on trackers for other purposes, in the present invention, the GPS data is used in aiding the tracker 10 to locate the beacon 12. As shown in FIGS. 2-3, the magnetic field emitted by the beacon 12 has a null point 22. In particular, the magnetic field has a front null 22a disposed in front of the bit 16 (FIG. 1) and beacon 12, and a rear null 22b disposed between the beacon and the drilling machine 20. The null point 22 is important, as it may be used to isolate field geometry and achieve precise depth and location readings.

Figure 5:
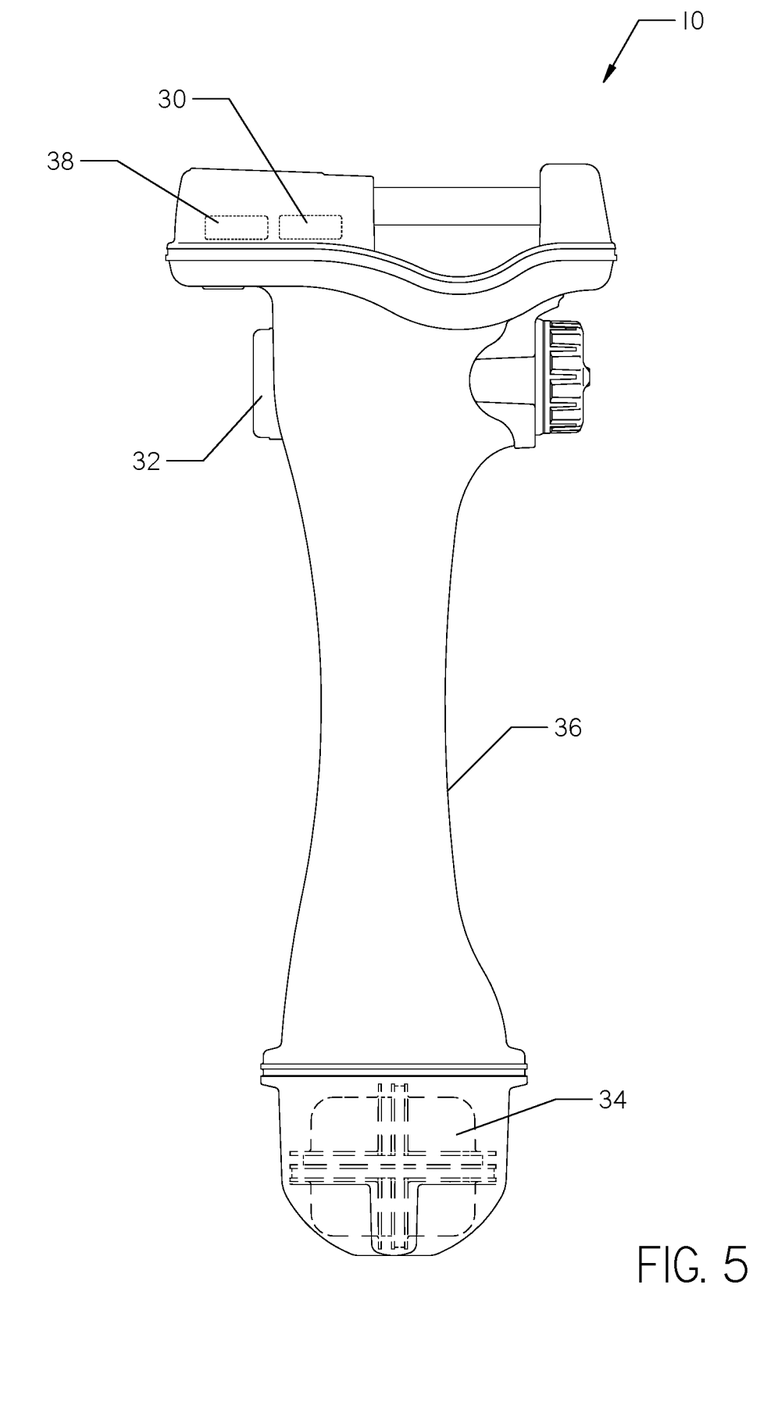
FIG. 5 is a side view of a tracker apparatus with a triaxial antenna, processor, and orientation sensor located within the case and represented with dashed lines.

Components of the tracker 10 are shown in FIG. 5. The tracker 10 comprises an orientation sensor 30, a GPS receiver 32, and an antenna 34, each supported on the same frame 36. The orientation sensor 30 comprises a compass to determine the angle of the tracker relative to magnetic north. The orientation sensor 30 may further comprise an accelerometer, gyro, and other instruments for determining a tilt of the tracker 10 frame 36 relative to vertical.

The GPS receiver 32 is configured to receive signals from a global positioning system 40. The global positioning system 40 is represented in FIGS. 2A-2B, 3A-3B by a satellite. It should be understood that the global positioning system 40 maintained by the United States government provides geolocation and time information to receivers having line-of-sight with the system 40. Typically, line-of-sight with four or more satellites is optimal. The GPS receiver 32 preferably is accurate to 30 centimeters or less. In ideal conditions, accuracy of four centimeters or less is possible.

Figure 6A:
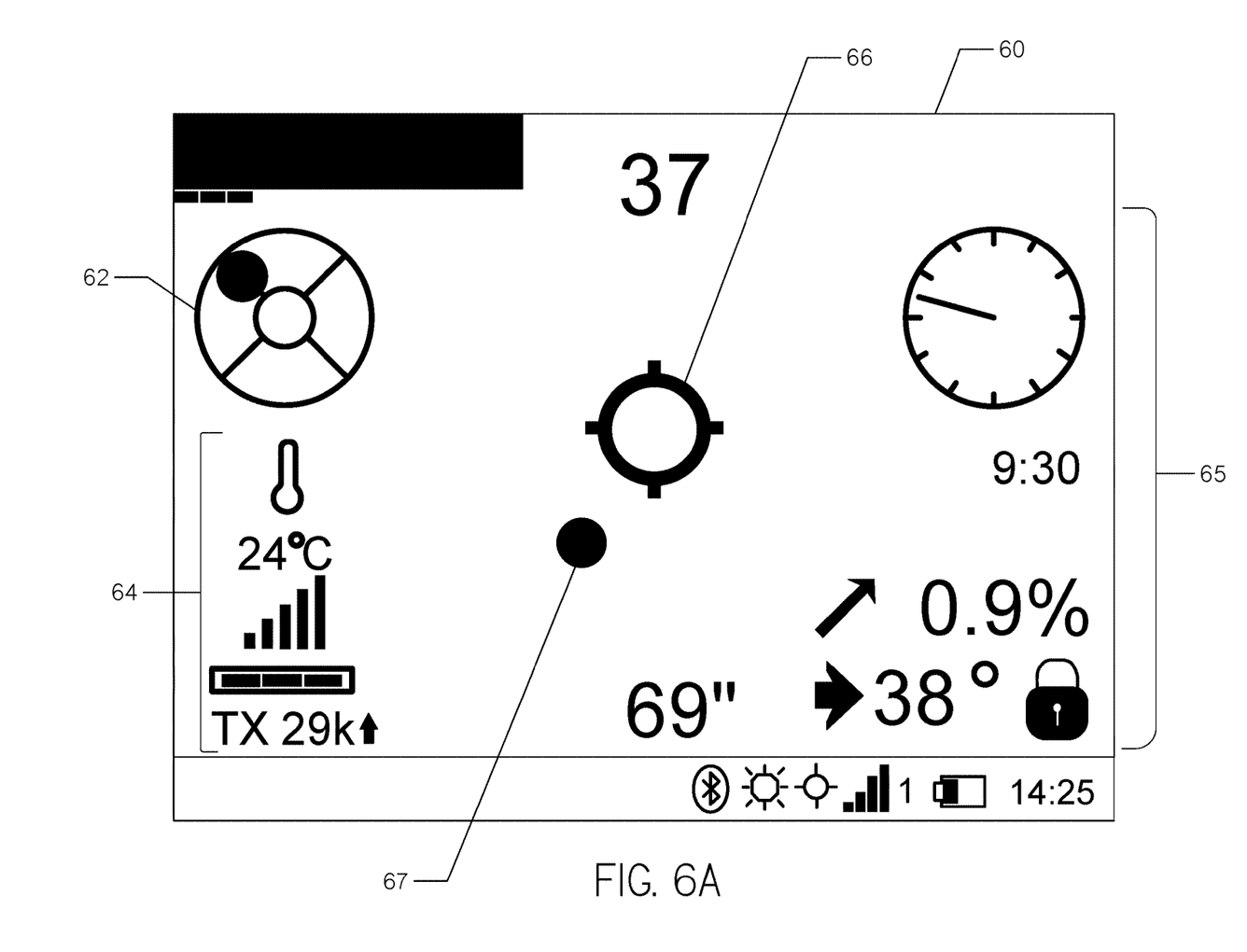
FIG. 6A is a display for use with the tracker, representative of the tracker at the first position.
Figure 6B:
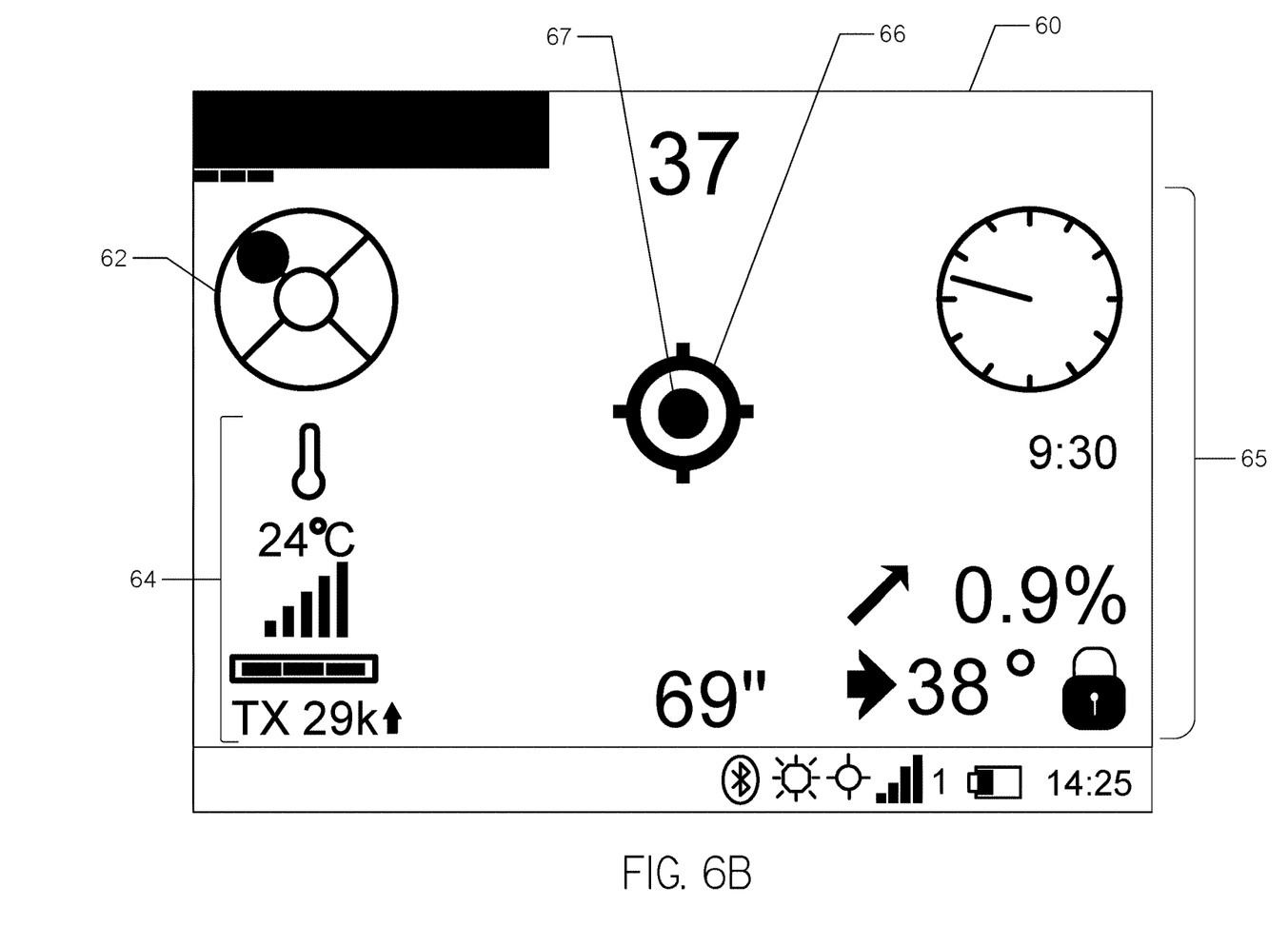
FIG. 6B is a display for use with the tracker, representative of the tracker at the second position prior to determining the position of the detected null relative to the beacon.
Figure 6C:
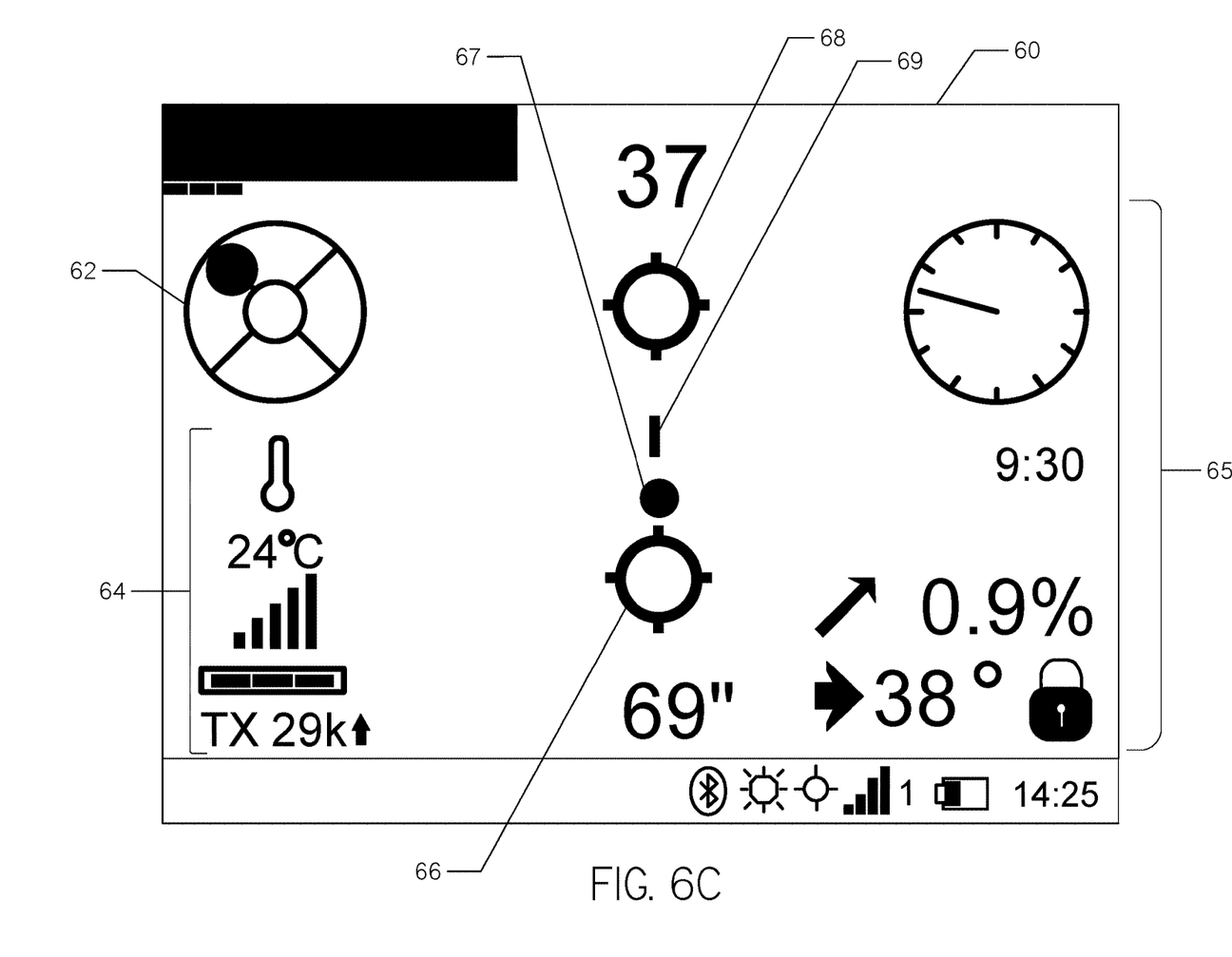
FIG. 6C is a display for use with the tracker, representative of the tracker after determining the position of the two null points relative to the beacon.

A processor 38 in communication with the antenna 34, GPS receiver 32, and orientation sensor 30 may be provided on the frame 36. The processor 38 may receive signals from each of these components, and make determinations regarding the shape of the magnetic field emitted by the beacon 12 based on the signals. Alternatively, the processor 38 may be located remotely from the frame 36. As shown, the processor 38 may cause information to be displayed on a display 60 (FIGS. 6A-6C). The processor 38 may also include a memory for storing information related to the signals received.

Figure 4:
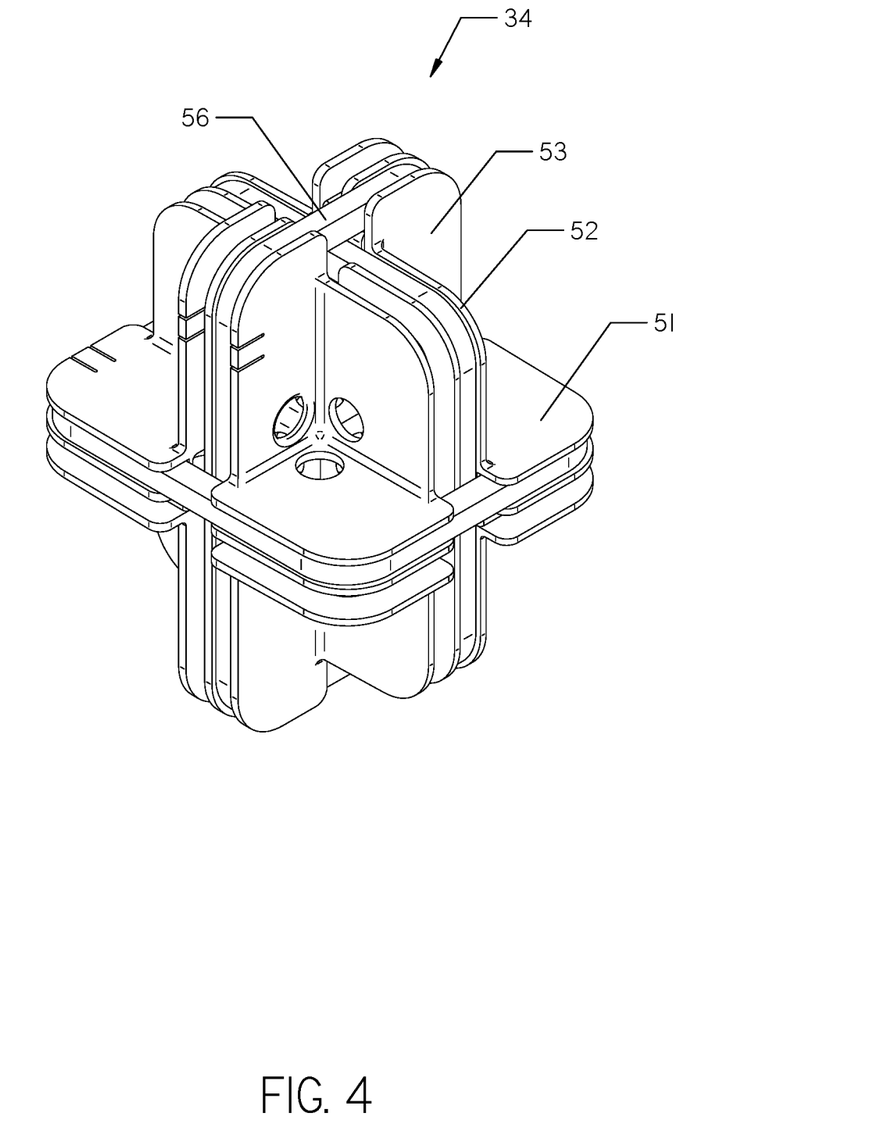
FIG. 4 is a perspective view of a triaxial antenna for use with a tracker.

With reference to FIGS. 4-5 the antenna 34 is supported at a lower end of the frame 36. The antenna 34 comprises three components 51, 52, 53 oriented about orthogonal axes. Each component 51, 52, 53 support one or more windings 56 set about the perimeter of the associated component. Each antenna component 51, 52, 53 preferably has the same center point and equivalent area, with dual, paired windings wound in the opposite direction, as set forth in U.S. Pat. No. 8,928,323, Issued to Cole, the contents of which are incorporated herein by reference. Windings 56 may be litz wire, solid magnet wire, or other antenna wire known in the art. Similar antenna 34 designs with single windings 56 may also be used.

With reference to FIGS. 2A-3C, a procedure for determining field characteristics is shown. FIGS. 2A-2C show a first measurement taken at the tracker 10 of the magnetic field 21 emitted by beacon 12. FIGS. 3A-3C show a second measurement taken at the field null point 22, with the previous measurement's location shown in dashed lines. FIGS. 2A and 3A are shown from the side of the beacon 12, FIGS. 2B and 3B are shown from directly behind the beacon, and FIGS. 2C and 3C are shown from above, with the ground surface being transparent so that the tracker 10 location and beacon 12 can both be shown.

With the tracker 10 within the magnetic field at the first location 70 shown in FIGS. 2A-2C, the antenna 34 detects vector components of the magnetic field 21. This information allows the processor 38 to determine potential above-ground locations of the first location 70 relative to the underground beacon 12 emitting the field 21. The information also uses the vector angles detected at each component 51, 52, 53 of the antenna 34 to estimate a direction to the closest null point 22. It should be understood that the relative detected vectors at one location cannot determine the absolute location of the beacon 12 or identification of the null point 22, as the magnetic field 21 may have more than one location exhibiting a particular set of characteristics.

The first measurement is taken, providing the onboard processor of the tracker 10 with information about signal strength in the x, y, and z plane based on detection by the triaxial antenna 34. Additionally, the absolute location of the antenna 34 as detected by the GPS receiver 32 is recorded. This location indicates the position of the tracker 10 to an acceptable rate of error. Simultaneously, the orientation sensor 30 sends a signal indicative of the heading and tilt, if any, of the tracker 10 frame 36. Thus, corrections to the detected field due to frame 36 orientation may be considered.

As shown in FIGS. 3A-3C, the tracker 10 is then moved to a second location 72. As shown, the second location 72 is a null point 22, but the discussion herein is similar if the second location 72 is not a null.

Without advancing the drill string 14, the tracker 10 may be moved to a second location, and a second measurement taken. The second measurement provides the same information as the first measurement—namely signal strength in the x, y, and z planes and the absolute location of the antenna 34 as received by the GPS receiver 32.

The processor 38 may then compare the values of the second measurement to the first measurement. The processor 38 further has recorded the absolute locations of the first and second measurement, and the vector distance between the locations at which each measurement was taken. Critical to the method are the relative signal strengths of the two measurements and the movement of the tracker 10 toward or away from the drilling machine 20 when moving to the second location. This comparison allows the processor 38 to determine the shape of the field, the origin of the field at the beacon 12, the location of the null points 22 relative to the tracker 10, and the absolute positions of the beacon 12 and tracker 10.

While two measurements are discussed herein, it should be understood that an operating tracker may take iterative measurements of the magnetic field 21 on an ongoing basis. Such iterations will allow the processor 38 to make refinements to the measured locations of the null points 22 and track the beacon 12 when it is advanced by the drill string 14. The processor 38 may use the two most recent measurements, or may use more than two measurements in determining characteristics of the magnetic field 21.

Calculations solving for the determination of the magnetic field source location are given in U.S. Pat. No. 7,647,987, Cole, which has been previously incorporated by reference, and U.S. Pat. No. 9,547,101, issued to Cole, which is incorporated by reference herein.

In previous solutions, the location of a beacon 12 or a null point 22 could be determined relative to two above-ground locations only when certain variables were known. For example, the field equations given in Cole '101 require that the antennas be within a "transmitter" plane—that is, the frame is maintained in a position where the two measurement points are perpendicular to the axis of a beacon 12. (See Col. 9, ll. 46-49.) Because the GPS receiver 32 makes absolute position available to the processor 38 of the tracker 10 without requiring that the measurements are taken in a particular orientation, such limitations in previous tracking solutions can be overcome.

With reference to FIGS. 6A-6C, the display 60 is shown. The display 60 comprises a level indicator 62, which is a display of the tilt as detected by the orientation sensor 30. Indications of beacon 12 temperature, signal strength, battery level and frequency are given in area 64. Beacon 12 roll position, pitch indicator, and suggested steering corrections are shown in area 65.

In FIG. 6A, a target 66 is in the middle of the display 60. The target 66 represents the approximate location of the closest null 22. A dot 67 represents the location of the tracker 10. In FIG. 6B, the tracker 10 is moved to the null 22 location. As a result, the dot 67 is shown within the target 66.

It should be understood that the magnetic field has two null points 22, one in front of the beacon 12 and one behind. In common single-antenna tracking systems, the null points 22 have indistinguishable characteristics. However, in the current tracker 10, the absolute position of the first location 70 (FIGS. 2A-2C), second location 72 (FIGS. 3A-3C), and drilling machine 20 are known.

When the tracker 10 is in the configuration of FIG. 6A, the tracker 10 needs to be moved forward and to the right so that the dot 67 enters the target 66, as in FIG. 6B. At this point, any further movement will reveal which null point 22 was found. If the operator moves away from the drilling machine 20 and the signal increases, the null found is the rear null 22*b*. Conversely, if the operator moves the tracker 10 away from the drilling machine 20 and the magnetic field 21 signal decreases, the null point 22 found is the front null 22*a*. This is because the overall magnetic field 21 signal emanating from the beacon 12 is essentially a normal curve with the maximum signal being located directly above the beacon.

When the location and identification of each null 22 and the beacon 12 is complete, a representation of the tracker location, beacon location, and each null location may be shown on the display 60, as shown in FIG. 6C.

Once the processor 38 determines which null point 22 is at the target 66, a second target 68 is placed at the position of the other null, and a beacon 12 indicator 69 is shown halfway between the targets 66, 68. In FIG. 6C, the target 66 is the rear null 22*b* and the second target 68 is the front null 22*a*.

While the simple method described above describes placing the tracker 10 at the null point 22, the magnetic field 21 strength approximates a normal curve for all lines parallel to the orientation of the beacon 12. Therefore, it should be understood that magnetic field measurements, absolute locations, and the location of drilling machine 20 may be used by the processor to identify the null as a front null 22*a* or rear null 22*b*. Thus, the second measurement may take place at any location within the magnetic field 21 to determine an estimated beacon 12 position relative to the detected null 22 and the drilling machine 20, allowing the map of FIG. 6C to be generated.

The dot 67 will move around the local map on the display 60 as the tracker 10 moves. The tracker 10 may be placed at the front null 22*a* as represented by the second target 68 or over the beacon 12 as represented by the indicator 69 as needed for the particular task. At these points, the magnetic field 21 signal can be used to verify the initial location estimates determined by the processor 38. The beacon 12 and GPS signals can also be used to continually correct and adjust the locations of the different points of interest, such as the null points 22. As the drill string 14 advances the bit 16 and beacon 12, its absolute position can be tracked as the magnetic field 21 source moves in the underground environment.

At the front null point 22*a*, the estimated beacon depth and a predicted depth of the beacon 12 along a projected path may be calculated. Depth may be estimated using known equations for the remaining component of the field—that is—the vertical component thereof as detected by the component 51 of the antenna 34 perpendicular to the vertical direction.

The local map generated at the display 60 can be overlaid on actual map images, such as those available at Google maps, whether through a Bluetooth connection, or loaded from a memory card, etc.

Steering corrections for the drill string 14, mapping the borepath, and parameters of the drilling operation are conducted as in the prior art. Depth of the beacon 12 itself is determined much as in the prior art methods. The modification made here involves the use of GPS positions of measurement locations to find and identify null points 22 of the magnetic field 21.

Changes may be made in the construction, operation and arrangement of the various parts, elements, steps and procedures described herein without departing from the spirit and scope of the invention as described in the following claims. Thus, while the principal preferred construction and modes of operation of the invention have been explained in what is now considered to represent its best embodiments, it should be understood that within the scope of the appended claims, the invention may be practiced otherwise than as specifically illustrated and described.

Phrases in the claims such as "configured to" are not intended to invoke the provisions of 35 U.S.C. § 112(f). When § 112 (f) is invoked herein, it will be due to the explicit use of the words "means for" or "step for".

What is claimed is:

1. An above-ground tracking system, comprising:
    a portable frame extending from a first end to a second end;
    a display disposed on the frame proximate the second end;
    a receiving antenna supported by the frame proximate the first end, wherein the receiving antenna is responsive to a magnetic dipole field;
    a global positioning system receiver supported by the frame;
    a processor coupled to the antenna and receiver; and
    a memory coupled to the processor having program instructions stored therein which, when executed by the processor, perform the steps of:
        in response to a first and single user request, obtaining a first set of measurements comprising:
            a location measurement from the global positioning receiver; and
            a magnetic field measurement from the receiving antenna; and
        thereafter, obtaining iterative sets of measurements, comprising:
            a location measurement from the global positioning receiver; and
            a magnetic field measurement from the receiving antenna;
        determining from the magnetic field measurements of the first set of measurements and iterative sets of measurements, as the location measurement and magnetic field measurement change, a relative position of a null location within the magnetic field at which the magnetic dipole field is vertical; and
        recording an absolute position of the null location within the magnetic dipole field using the location measurement of the first and iterative sets of measurements and the relative position.

2. The above ground tracking system of claim 1, wherein the null location is characterized as a first null location and further comprising:
    determining from the magnetic field measurements of the first set of measurements and the iterative sets of measurements, as the location measurement and magnetic field measurement change, a relative position of a second null location within the magnetic dipole field at which the magnetic dipole field is vertical.

3. The above ground tracking system of claim 1 further comprising an orientation sensor disposed on the portable frame.

4. A system comprising:
    a horizontal directional drill;
    a drill string having a first end and a second end, the drill string operatively connected to the horizontal directional drill at the first end;
    a downhole tool disposed at the second end of the drill string; and
    the system of claim 1;
    in which the magnetic dipole field emanates from the downhole tool.

5. The system of claim 4 wherein the memory has program instructions stored therein which further perform the step of:
    recording position of the horizontal directional drill relative to the frame; and
    determining whether the null location is a front null location or a rear null location using the recorded position of the horizontal directional drill and the magnetic field measurements of the first set of measurements and iterative set of measurements, wherein:
        the front null is characterized by being beyond the second end of the drill string; and
        the rear null is characterized by being between the horizontal directional drill and the second end of the drill string.

6. A method of using the system of claim 4 comprising:
    obtaining the first set of measurements at a first location; and
    obtaining at least one of the iterative sets of measurements at a second location spaced apart from the first location.

7. A method of using the system of claim 4 comprising:
    obtaining the first set of measurements at a first location;
    moving the downhole tool; and
    thereafter, obtaining at least one of the iterative sets of measurements at the first location.

8. The method of claim 7 further comprising:
    while maintaining the above-ground tracking system at the first location and moving the downhole tool:
        determining one or more absolute positions of a front null location;
        determining one or more absolute positions of a rear null location;
        determining one or more absolute positions of the source of the magnetic dipole field; and
        saving the one or more positions of the front null location, rear null location, and source of the magnetic dipole field in a memory.

9. The method of claim 8 further comprising displaying the front null location, rear null location, and source of the magnetic dipole field on the display.

10. The method of claim 8 further comprising:
    generating a map of the one or more positions of the front null location, rear null location, and source of the magnetic dipole field.

11. The method of claim 8 further comprising:
    updating the recorded absolute position of the source of the magnetic dipole field using the iterative set of measurements.

12. A kit, comprising:
    the above ground tracking system of claim 1; and
    a transmitter configured to emit the magnetic dipole field, wherein the transmitter is defined by first and second modes such that:
        the transmitter emits the magnetic dipole field in the first mode; and
        the transmitter does not emit the magnetic dipole field in the second mode.

13. The kit of claim 12, in which the transmitter is disposed at an end of a drill string extending in a first direction from a drilling machine.

14. A system, comprising:
    the kit of claim 12, wherein:
        the transmitter is disposed at a below-ground location and is in the first mode; and
        the above ground tracking system is disposed at an above-ground location and within the magnetic dipole field.

* * * * *

UNITED STATES PATENT AND TRADEMARK OFFICE
CERTIFICATE OF CORRECTION

| | | |
|---|---|---|
| PATENT NO. | : 12,007,491 B2 | Page 1 of 1 |
| APPLICATION NO. | : 17/857623 | |
| DATED | : June 11, 2024 | |
| INVENTOR(S) | : Cole et al. | |

It is certified that error appears in the above-identified patent and that said Letters Patent is hereby corrected as shown below:

In the Claims

Column 7, Claim 5, Line 4, after the word "recording", please insert --a--.

Signed and Sealed this
Thirtieth Day of July, 2024

Katherine Kelly Vidal
*Director of the United States Patent and Trademark Office*